(12) United States Patent
Oki (10) Patent No.: US 11,400,808 B2
(45) Date of Patent: Aug. 2, 2022

(54) HYBRID VEHICLE SYSTEM

(71) Applicant: SUBARU CORPORATION, Tokyo (JP)

(72) Inventor: Shogo Oki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 154 days.

(21) Appl. No.: 16/880,415

(22) Filed: May 21, 2020

(65) Prior Publication Data
US 2021/0070171 A1 Mar. 11, 2021

(51) Int. Cl.
| | | |
|---|---|---|
| *B60K 20/02* | (2006.01) | |
| *B60K 6/24* | (2007.10) | |
| *B60K 6/38* | (2007.10) | |
| *B60K 6/26* | (2007.10) | |
| *B60K 6/36* | (2007.10) | |

(52) U.S. Cl.
CPC ............... *B60K 20/02* (2013.01); *B60K 6/24* (2013.01); *B60K 6/26* (2013.01); *B60K 6/36* (2013.01); *B60K 6/38* (2013.01); *B60Y 2200/92* (2013.01)

(58) Field of Classification Search
CPC ... B60K 6/36; B60K 6/38; B60K 6/40; B60K 6/54; B60K 6/543; B60W 10/02
See application file for complete search history.

(56) References Cited

U.S. PATENT DOCUMENTS

| | | | | |
|---|---|---|---|---|
| 2007/0293362 A1* | 12/2007 | Kamada | ................. | B60K 6/365 |
| | | | | 475/5 |
| 2008/0120011 A1* | 5/2008 | Iwase | ...................... | B60K 6/40 |
| | | | | 701/102 |
| 2008/0149407 A1* | 6/2008 | Shibata | ................. | B60W 10/26 |
| | | | | 180/65.27 |
| 2008/0153651 A1* | 6/2008 | Matsubara | ........ | B60W 30/1884 |
| | | | | 475/151 |

(Continued)

FOREIGN PATENT DOCUMENTS

| | | |
|---|---|---|
| JP | 2019-031193 A | 2/2019 |
| WO | WO 2017/131134 A1 | 8/2017 |

*Primary Examiner* — Jeffrey J Restifo
(74) *Attorney, Agent, or Firm* — McGinn IP Law Group, PLLC (57) ABSTRACT

A hybrid vehicle system includes an engine, a transmission mechanism, first and second clutch mechanisms, a motor generator, and a forward-reverse travel switching mechanism. The engine outputs torque. The transmission mechanism converts the torque at a predetermined transmission gear ratio. The first clutch mechanism allows and disallows power transmission between the transmission mechanism and a drive wheel. The motor generator is coupled to a power transmission path between the first clutch mechanism and the drive wheel. The second clutch mechanism allows and disallows power transmission between the motor generator and the drive wheel. The forward-reverse travel switching mechanism is coupled to a power transmission path between the engine and the transmission mechanism. The forward-reverse travel switching mechanism is coupled to a countershaft. The forward-reverse travel switching (Continued)

mechanism switches among a forward-travel direct coupling state, a reverse-travel direct coupling state, and a neutral state.

1 Claim, 5 Drawing Sheets

(56) References Cited

U.S. PATENT DOCUMENTS

| | | | | |
|---|---|---|---|---|
| 2008/0182710 A1* | 7/2008 | Shibata | B60K 6/40 | 477/3 |
| 2008/0208422 A1* | 8/2008 | Shibata | B60W 30/18072 | 701/54 |
| 2009/0069147 A1* | 3/2009 | Tabata | B60K 6/445 | 477/3 |
| 2009/0088291 A1* | 4/2009 | Kumazaki | B60W 10/06 | 477/35 |
| 2009/0227408 A1* | 9/2009 | Imamura | B60W 20/10 | 475/5 |
| 2010/0044132 A1* | 2/2010 | Matsubara | B60K 6/445 | 180/65.285 |
| 2010/0125019 A1* | 5/2010 | Tabata | B60W 10/115 | 477/3 |
| 2010/0151988 A1* | 6/2010 | Tabata | B60W 30/18072 | 477/3 |
| 2010/0197449 A1* | 8/2010 | Imamura | B60W 10/06 | 477/3 |
| 2010/0216584 A1* | 8/2010 | Lutoslawski | B60K 6/48 | 475/5 |
| 2011/0111910 A1* | 5/2011 | Ideshio | B60K 6/36 | 475/5 |
| 2011/0203409 A1* | 8/2011 | Nishida | B60K 6/48 | 74/665 A |
| 2013/0337961 A1* | 12/2013 | Kaltenbach | F16H 37/046 | 475/207 |
| 2013/0345010 A1* | 12/2013 | Kaltenbach | F16H 37/065 | 475/5 |
| 2015/0107408 A1* | 4/2015 | Kaltenbach | B60K 6/365 | 74/661 |
| 2016/0325735 A1* | 11/2016 | Kato | B60W 10/02 | |
| 2017/0131134 A1* | 5/2017 | Kang | G01G 19/083 | |
| 2018/0319264 A1* | 11/2018 | Kaltenbach | B60K 6/365 | |
| 2018/0319265 A1* | 11/2018 | Kaltenbach | B60K 6/365 | |
| 2018/0319266 A1* | 11/2018 | Kaltenbach | F16H 3/097 | |
| 2018/0319267 A1* | 11/2018 | Kaltenbach | B60K 6/547 | |
| 2018/0354520 A1* | 12/2018 | Kaltenbach | B60W 10/113 | |
| 2019/0040949 A1 | 2/2019 | Amano et al. | | |
| 2019/0299976 A1* | 10/2019 | Okamura | B60W 10/06 | |
| 2019/0389298 A1* | 12/2019 | Kaltenbach | B60K 6/547 | |
| 2021/0070171 A1* | 3/2021 | Oki | B60K 6/24 | |
| 2021/0070280 A1* | 3/2021 | Genise | B60K 6/387 | |
| 2021/0354550 A1* | 11/2021 | Kaltenbach | B60K 6/442 | |

* cited by examiner

| | FORWARD-REVERSE TRAVEL SWITCHING MECHANISM 40 | FIRST CLUTCH MECHANISM 61 | SECOND/THIRD CLUTCH MECHANISMS 63, 65 | VARIATOR 30 | ENGINE 10 | MOTOR GENERATOR 20 |
|---|---|---|---|---|---|---|
| LOW-SPEED FORWARD TRAVEL | D | OPEN | LOCK | - | ✓ | - |
| CVT FORWARD TRAVEL | N | LOCK | LOCK | DRIVEN | ✓ | - |
| REVERSE TRAVEL | R | OPEN | LOCK | - | ✓ | - |
| NEUTRAL | N | OPEN | OPEN | - | - | - |
| VEHICLE-STOPPAGE POWER GENERATION | D | OPEN | OPEN | - | ✓ | ✓ |
| EV FORWARD TRAVEL | N | OPEN | LOCK | - | - | ✓ |
| EV REVERSE TRAVEL | N | OPEN | LOCK | - | - | ✓ |
| ENGINE STARTING | D | OPEN | OPEN | - | ✓ | ✓ |

HYBRID VEHICLE SYSTEM

CROSS-REFERENCE TO RELATED APPLICATIONS

The present application claims priority from Japanese Patent Application No. 2019-164694 filed on Sep. 10, 2019, the entire contents of which are hereby incorporated by reference.

BACKGROUND

The disclosure relates to a hybrid vehicle system.

A hybrid vehicle including an engine and a motor as drive sources has been known. As a transmission for a vehicle, there is a continuously variable transmission to seamlessly change input torque in gear ratio and transmit the torque. WO 2017/131134 A, for example, discloses a hybrid vehicle system in which an engine and a motor are disposed upstream of a variator, which is a transmission mechanism. Japanese Unexamined Patent Application Publication (JP-A) No. 2019-31193 discloses a hybrid vehicle system in which an engine is disposed upstream of a variator, and a motor is disposed downstream of the variator.

SUMMARY

An aspect of the disclosure provides a hybrid vehicle system including an engine, a transmission mechanism, a first clutch mechanism, a motor generator, a second clutch mechanism, and a forward-reverse travel switching mechanism. The engine is capable of outputting torque transmitted to a drive wheel. The transmission mechanism is configured to convert the torque outputted from the engine at a predetermined transmission gear ratio. The first clutch mechanism is capable of allowing and disallowing power transmission between the transmission mechanism and the drive wheel. The motor generator is coupled to a power transmission path between the first clutch mechanism and the drive wheel. The second clutch mechanism is capable of allowing and disallowing power transmission between the motor generator and the drive wheel. The forward-reverse travel switching mechanism is coupled to a power transmission path between the engine and the transmission mechanism. The forward-reverse travel switching mechanism is coupled to a countershaft coupled to the power transmission path between the first clutch mechanism and the drive wheel. The forward-reverse travel switching mechanism is configured to switch among a forward-travel direct coupling state to directly couple an engine side and a drive wheel side to transmit torque in a direction to cause a vehicle to travel forward, a reverse-travel direct coupling state to directly couple the engine side and the drive wheel side to transmit torque in a direction to cause the vehicle travel rearward, and a neutral state to decouple the engine side and the drive wheel side from each other.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

With the configuration disclosed in WO 2017/131134 A in which the motor is disposed upstream of the variator, the sum of output torque from the engine and output torque from the motor is input to the variator. Consequently, a torque capacity transmittable by the variator causes such a limitation that it may be difficult to increase a torque capacity outputted to drive wheels in some cases. Moreover, with this configuration, in electric travel with the engine stopped or in regenerative operation with the motor regenerating power using torque from the drive wheels, the motor and the drive wheels are coupled via the variator. This may degrade efficiency.

With the configuration disclosed in JP-A No. 2019-31193 in which the motor is disposed downstream of the variator, the engine and the motor are coupled via the variator so as to cause the motor to generate power using output torque from the engine during stoppage of a vehicle (to perform vehicle-stoppage power generation). This may degrade efficiency. Moreover, with this configuration, a clutch mechanism is to be decoupled not to transmit torque to drive wheels during the power generation. Consequently, to resume travel of the vehicle, the clutch mechanism is to be coupled. This may cause a response delay in switching from a vehicle-stoppage power generation mode to a travel mode.

A dual-motor system may be considered in which a motor is disposed on each of an upstream side and a downstream side of the variator. However, the configuration including two motors increases the costs and mass.

It is desirable to provide a hybrid vehicle system that makes it possible to efficiently perform power running drive and regenerative drive utilizing a single motor.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. General Arrangement of Hybrid Vehicle System

Figure 1:
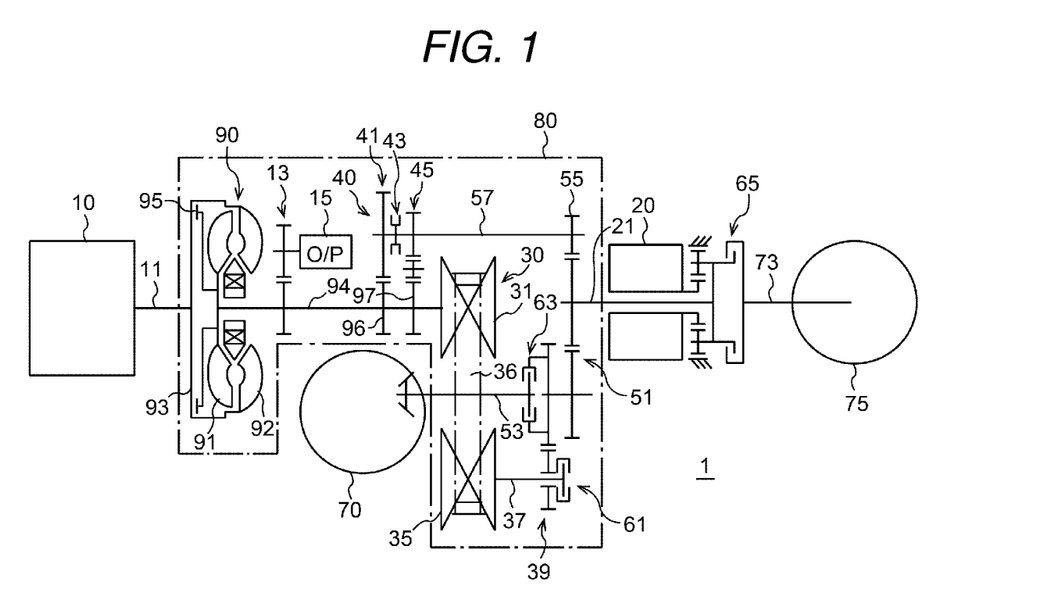
FIG. 1 is a diagram schematically illustrating an exemplary configuration of a hybrid vehicle system according to an embodiment of the disclosure.

First, referring to FIG. 1, the general arrangement of a hybrid vehicle system according to the embodiment of the disclosure will be described. FIG. 1 is a diagram schematically illustrating an exemplary configuration of a hybrid vehicle system 1 according to the embodiment.

As illustrated in FIG. 1, the hybrid vehicle system 1 includes an engine 10, a motor generator 20, and an automatic transmission 80 and is capable of using both of the engine 10 and the motor generator 20 as drive sources. The hybrid vehicle system 1 is capable of controlling drive of a vehicle in an engine travel mode, an electric travel mode (EV mode), and a hybrid travel mode (HEV mode).

In the engine travel mode, the vehicle is driven by torque output from the engine 10. In the EV mode, the vehicle is driven by torque output from the motor generator 20. In the HEV mode, the vehicle is driven by torque outputted from the motor generator 20 and the engine 10.

The engine 10 is an internal combustion engine driven using gasoline, for example, as a fuel to generate torque, and includes a crankshaft 11 as an output shaft. The crankshaft 11 extends into the automatic transmission 80.

The motor generator 20 is, for example, a three-phase alternating current synchronous motor, and is coupled to a battery with an inverter, not illustrated. The motor generator 20 functions as a drive motor driven using power of the battery (power running drive) to generate driving force for the vehicle, functions as a generator driven using torque outputted from the engine 10 to generate power, and functions as a generator regeneratively driven at the time of deceleration of the vehicle to generate power using kinetic energy of drive wheels 70. Furthermore, the motor generator 20 functions as a starter motor to start the engine 10.

The automatic transmission 80 includes a torque converter 90, a forward-reverse travel switching mechanism 40, a variator 30, which is a continuously variable transmission (CVT) as a transmission mechanism, a first clutch mechanism 61, a second clutch mechanism 63, and a third clutch mechanism 65. It is noted that each of the clutch mechanisms includes, for example, a wet multi-disc clutch, a synchronizer engagement mechanism, and a dog engagement mechanism.

The torque converter 90 is interposed between the engine 10 and the variator 30. Torque outputted from the engine 10 is transmitted to the variator 30 via the torque converter 90. The torque converter 90 includes a pump impeller 92 that is coupled to the crankshaft 11 of the engine 10 through a front cover 93, and a turbine liner 91 that faces the pump impeller 92 and is coupled to a turbine shaft 94. Hydraulic oil is supplied into the torque converter 90 so that the output torque from the engine 10 is transmitted from the pump impeller 92 to the turbine liner 91 using the hydraulic oil. The torque converter 90 also includes a lock-up clutch 95 to directly couple the crankshaft 11 of the engine 10 to the turbine shaft 94.

A mechanical oil pump 15 is coupled to the turbine shaft 94 with a gear train 13. The oil pump 15 is driven by rotation of the turbine shaft 94 so as to supply the hydraulic oil to a hydraulic control mechanism in the automatic transmission 80. Via a valve unit, not illustrated, the hydraulic oil is supplied to the torque converter 90, the variator 30, the forward-reverse travel switching mechanism 40, the first clutch mechanism 61, the second clutch mechanism 63, and the third clutch mechanism 65.

The variator 30 includes a primary pulley 31 secured to the turbine shaft 94, and a secondary pulley 35 secured to a secondary shaft 37. A winding power transmission member 36 made of a belt or a chain is wound on the primary pulley 31 and the secondary pulley 35. The variator 30 changes a winding diameter of the power transmission member 36 on the primary pulley 31 and the secondary pulley 35 so as to change a pulley ratio. Thus, between the turbine shaft 94 and the secondary shaft 37, torque is converted and transmitted at a transmission gear ratio in accordance with a travel state of the vehicle.

The secondary shaft 37 is coupled to a front-wheel output shaft 53 with the first clutch mechanism 61, a gear train 39, and the second clutch mechanism 63. The motor generator 20 is coupled to the front-wheel output shaft 53 with a gear train 51. The front-wheel output shaft 53 is coupled to the front wheels (drive wheels) 70 with a reduction gear and a drive shaft, not illustrated, so that driving force outputted via the front-wheel output shaft 53 can be transmitted to the front wheels 70.

The first clutch mechanism 61 enables the secondary shaft 37 of the variator 30 to be selectively coupled to or decoupled from the gear train 39. The second clutch mechanism 63 enables the gear train 39 and the gear train 51 to be selectively coupled to or decoupled from the front-wheel output shaft 53. Therefore, with both of the first clutch mechanism 61 and the second clutch mechanism 63 being in coupling states, power transmission between the variator 30 and the front-wheel output shaft 53 can be performed. With the second clutch mechanism 63 being in a coupling state, power transmission between the motor generator 20 and the front-wheel output shaft 53 can be performed.

The third clutch mechanism 65 enables the output shaft 21 of the motor generator 20 to be selectively coupled to or decoupled from a rear-wheel output shaft 73 to transmit torque to rear wheels (drive wheels) 75. The third clutch mechanism 65 functions as a transfer clutch. With the third clutch mechanism 65 being in a coupling state, the vehicle is in an all-wheel drive mode.

In the hybrid vehicle system 1 according to the embodiment, the forward-reverse travel switching mechanism 40 is coupled with gears to the turbine shaft 94, which is a power transmission path between the engine 10 and the variator 30. The forward-reverse travel switching mechanism 40 includes, for example, a synchronizer mechanism and is switchable among a forward-travel direct coupling state, a reverse-travel direct coupling state, and a neutral state. For example, the forward-reverse travel switching mechanism 40 includes a forward-travel gear 41, a reverse-travel gear set 45, and a synchronizer ring 43. A first gear 96 and a second gear set 97 are secured to the turbine shaft 94 at positions displaced from each other in an axial direction. The forward-travel gear 41 meshes with the first gear 96 of the turbine shaft 94, and the reverse-travel gear set 45 mesh with the second gear set 97 of the turbine shaft 94. The synchronizer ring 43 is secured to a countershaft 57 and pressed against the forward-travel gear 41 or the reverse-travel gear set 45 by hydraulic control, for example.

A helical gear 55 is secured to the countershaft 57 and coupled to the gear train 51. The countershaft 57 constitutes a power transmission path to transmit torque without involvement by the variator 30. This power transmission path is formed in parallel to the power transmission path to transmit torque via the variator 30. The forward-reverse travel switching mechanism 40 controls pressing the synchronizer ring 43 against the forward-travel gear 41 or the reverse-travel gear set 45 so that torque of the turbine shaft 94 can be transmitted to the front-wheel output shaft 53 and the rear-wheel output shaft 73 as forward-travel torque or reverse-travel torque without involvement by the variator 30.

In the forward-travel direct coupling state, the synchronizer ring 43 is pressed against the forward-travel gear 41 so that the torque of the turbine shaft 94 can be transmitted to the front-wheel output shaft 53 and the rear-wheel output shaft 73 without involvement by the variator 30. Thus, the engine 10 side of the variator 30 is directly coupled to the drive wheel 70, 75 side of the variator 30 to transmit torque in a direction for forward travel of the vehicle. In the reverse-travel direct coupling state, the synchronizer ring 43 is pressed against the reverse-travel gear set 45 so that the torque of the turbine shaft 94 can be transmitted to the front-wheel output shaft 53 and the rear-wheel output shaft 73 without involvement by the variator 30. Thus, the engine 10 side of the variator 30 is directly coupled to the drive wheel 70, 75 side of the variator 30 to transmit torque in a direction for reverse travel of the vehicle.

In the neutral state, the synchronizer ring 43 of the forward-reverse travel switching mechanism 40 is held in a neutral position so as not to transmit torque of the turbine shaft 94 to the countershaft 57 via the forward-reverse travel switching mechanism 40. Thus, the engine 10 side of the variator 30 is decoupled from the drive wheel 70, 75 side of the variator 30 not to transmit torque.

2. Exemplary Operation

Figure 2:
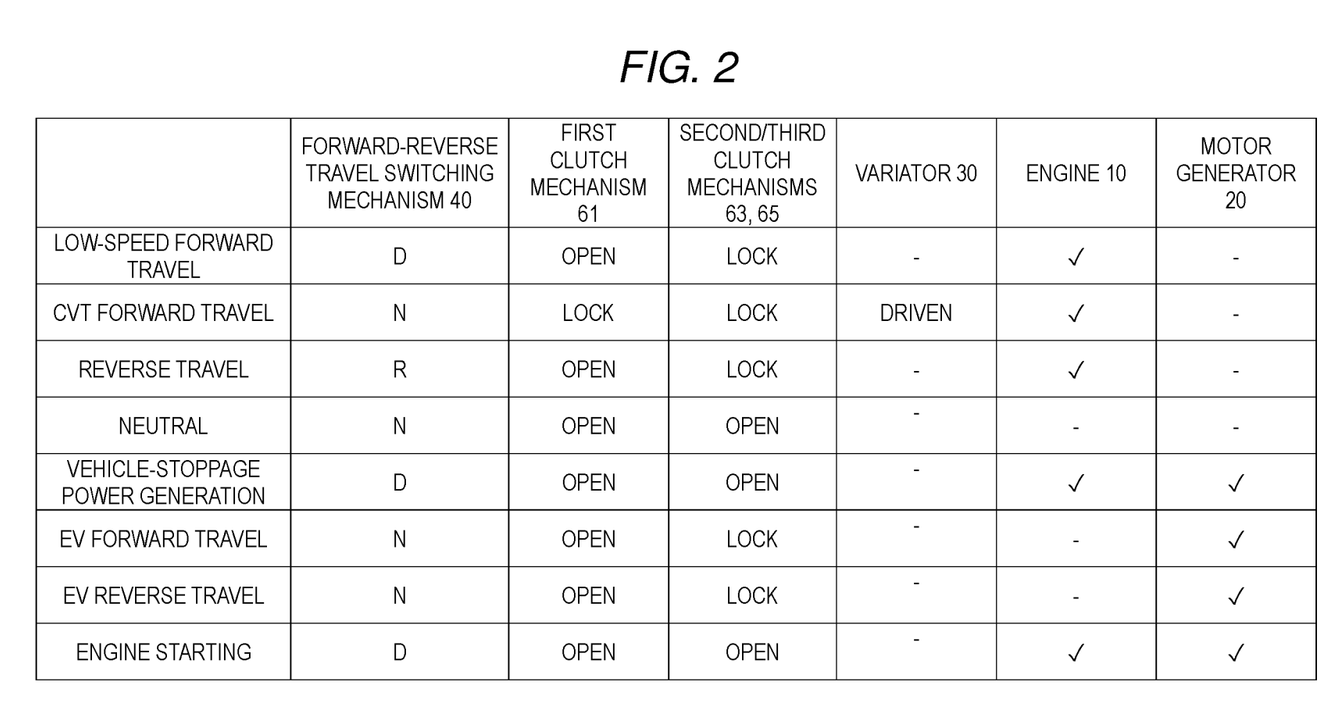
FIG. 2 is a table illustrating operation states in accordance with driving states of the hybrid vehicle system.

Next, referring to FIGS. 2 to 8, exemplary operation of the hybrid vehicle system 1 according to the embodiment will be described. FIG. 2 is a table illustrating operation states of the forward-reverse travel switching mechanism 40, the first clutch mechanism 61, the second clutch mechanism 63, the third clutch mechanism 65, the variator 30, the engine 10, and the motor generator 20 in accordance with driving states of the vehicle.

Figure 3:
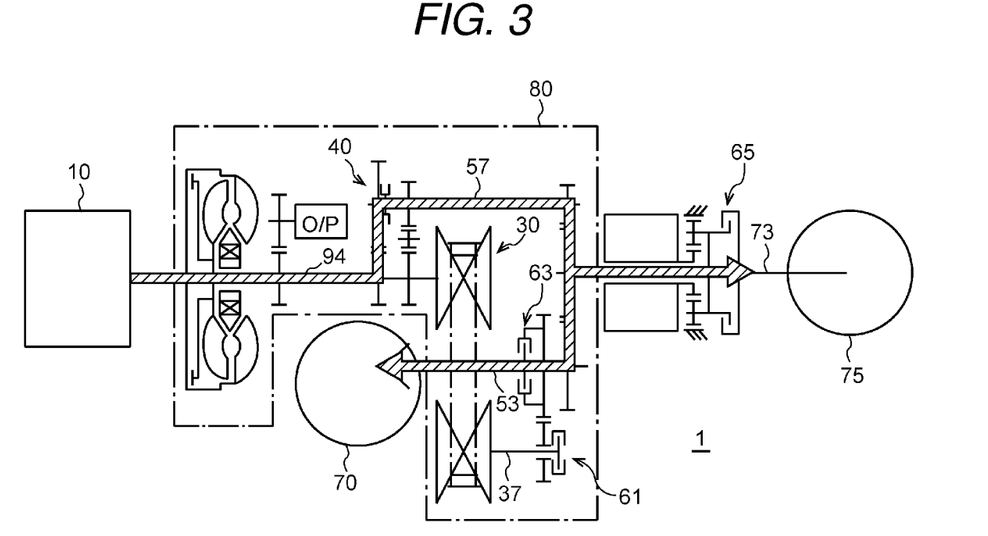
FIG. 3 is a diagram schematically illustrating an operation state in a low-speed forward travel state.

In a low-speed forward travel state that follows starting forward travel of the vehicle, the forward-reverse travel switching mechanism 40 is controlled and enabled to output forward-travel torque, the first clutch mechanism 61 is in an open state (that is, a decoupling state), and the second clutch mechanism 63 and the third clutch mechanism 65 are in lock states (that is, coupling states). In the low-speed forward travel state, the engine travel mode is set to cause the engine 10 to output drive torque. As illustrated in FIG. 3, torque outputted from the engine 10 is transmitted to the gear train 51 not via the variator 30 but via the forward-reverse travel switching mechanism 40 and the countershaft 57 and distributed to the front-wheel output shaft 53 and the rear-wheel output shaft 73. In the low-speed forward travel state, relatively large drive torque is used. However, since the torque outputted from the engine 10 is transmitted without involvement by the variator 30, a torque capacity of the variator 30 can be reduced to a small value. The torque outputted from the engine 10 is transmitted to the front-wheel output shaft 53 and the rear-wheel output shaft 73 without involvement by the variator 30. This can reduce transmission loss of the torque.

Figure 4:
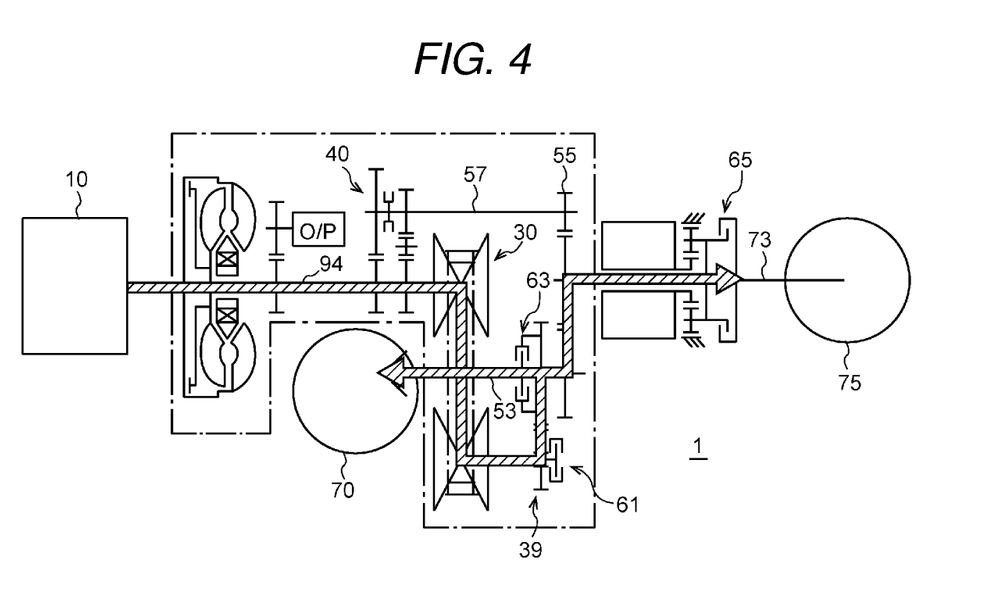
FIG. 4 is a diagram schematically illustrating an operation state in a CVT forward travel state.

In a CVT forward travel state in which the vehicle is traveling at a constant speed, the forward-reverse travel switching mechanism 40 is switched to the neutral state, and all of the first clutch mechanism 61, the second clutch mechanism 63, and the third clutch mechanism 65 are in lock states. In the CVT forward travel state, the engine travel mode is set to cause the engine 10 to output drive torque and drive the variator 30 to convert the torque outputted from the engine 10 at a desired transmission gear ratio. As illustrated in FIG. 4, the torque outputted from the engine 10 is transmitted to the gear train 39 via the variator 30 and distributed to the front-wheel output shaft 53 and the rear-wheel output shaft 73. Drive torque used in the constant-speed travel state is relatively small as compared with the low-speed forward travel state so that the torque capacity of the variator 30 can be reduced to a small value.

Figure 5:
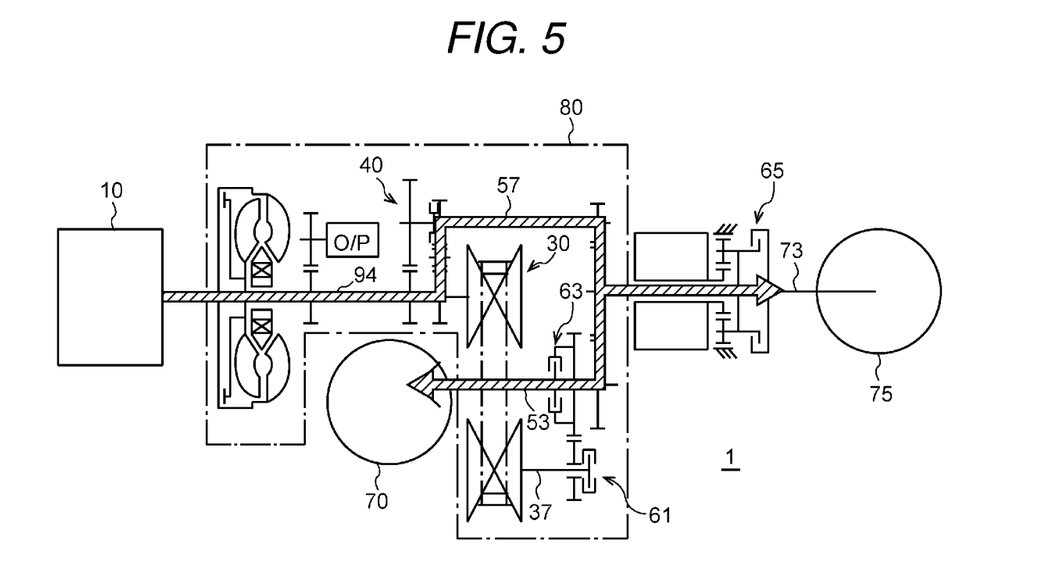
FIG. 5 is a diagram schematically illustrating an operation state in a reverse travel state.

In a reverse travel state of the vehicle, the forward-reverse travel switching mechanism 40 is controlled and enabled to output reverse-travel torque, the first clutch mechanism 61 is in an open state, and the second clutch mechanism 63 and the third clutch mechanism 65 are in lock states. In the reverse travel state, the engine travel mode is set to cause the engine 10 to output drive torque. In the reverse travel state, as illustrated in FIG. 5, the torque outputted from the engine 10 is transmitted to the gear train 51 not via the variator 30 but via the forward-reverse travel switching mechanism 40 and the countershaft 57 and distributed to the front-wheel output shaft 53 and the rear-wheel output shaft 73. This can reduce transmission loss of the torque.

In a neutral state of the vehicle, the forward-reverse travel switching mechanism 40 is switched to the neutral state, and all of the first clutch mechanism 61, the second clutch mechanism 63, and the third clutch mechanism 65 are in open states. In the neutral state of the vehicle, drive of engine 10 and the motor generator 20 is stopped.

Figure 6:
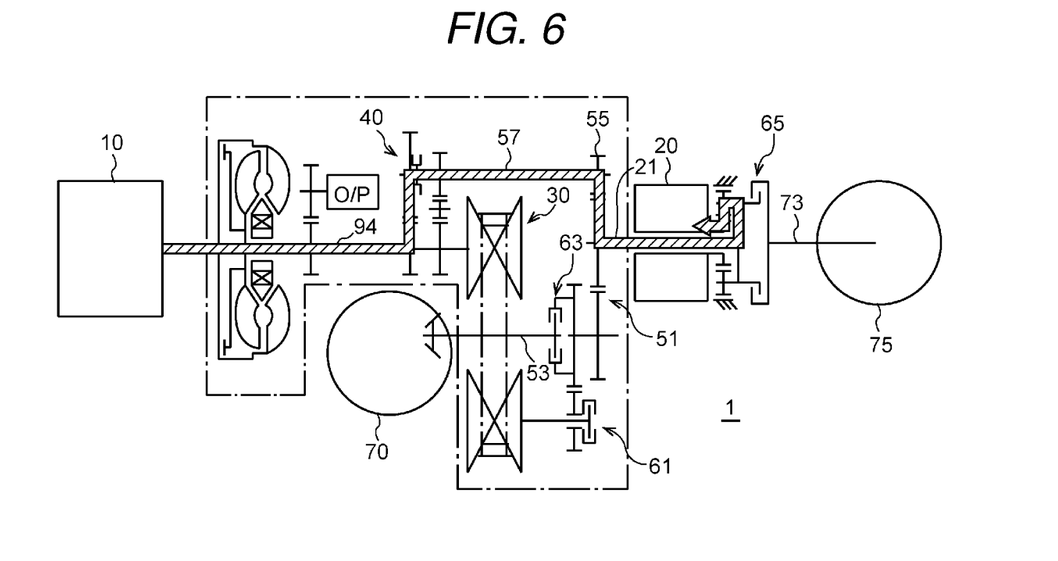
FIG. 6 is a diagram schematically illustrating an operation state in a vehicle-stoppage power generation state.

In a vehicle-stoppage power generation state, the forward-reverse travel switching mechanism 40 is controlled and enabled to output forward-travel torque, and all of the first clutch mechanism 61, the second clutch mechanism 63, and the third clutch mechanism 65 are in open states. In the vehicle-stoppage power generation state, drive torque outputted from the engine 10 is transmitted to the motor generator 20 to regeneratively drive the motor generator 20. As illustrated in FIG. 6, the torque outputted from the engine 10 is transmitted to the gear train 51 not via the variator 30 but via the forward-reverse travel switching mechanism 40 and the countershaft 57 and input to the output shaft 21. This can reduce transmission loss of the torque and cause the motor generator 20 to generate power efficiently.

Figure 7:
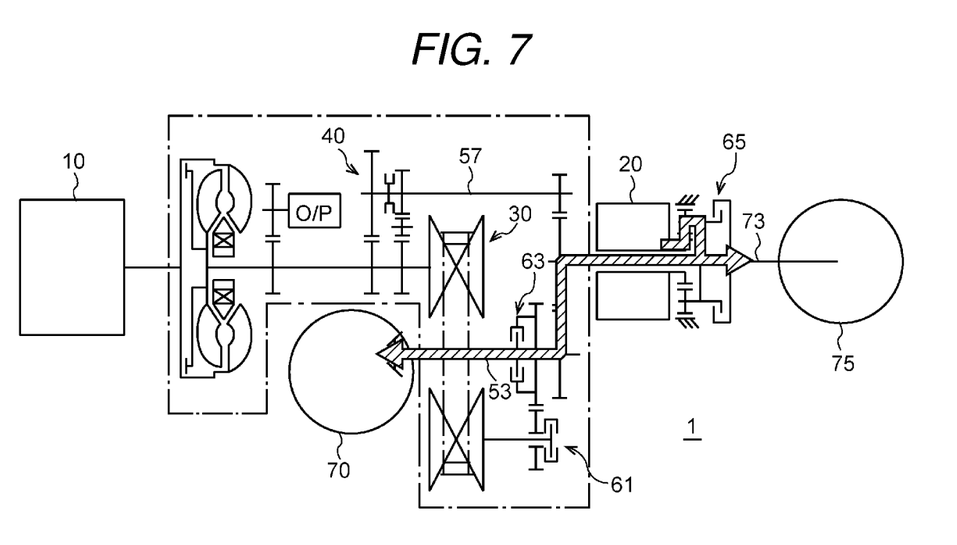
FIG. 7 is a diagram schematically illustrating an operation state in an EV forward travel state.

In an EV forward travel state of the vehicle, the forward-reverse travel switching mechanism 40 is switched to the neutral state, the first clutch mechanism 61 is in an open state, and the second clutch mechanism 63 and the third clutch mechanism 65 are in lock states. In the EV forward travel state, the EV travel mode is set to cause the motor generator 20 to output drive torque. As illustrated in FIG. 7, the torque outputted from the motor generator 20 is transmitted to the front-wheel output shaft 53 and the rear-wheel output shaft 73 without involvement by the variator 30. This can reduce transmission loss of the torque.

In an EV reverse travel state of the vehicle, the forward-reverse travel switching mechanism 40 is switched to the neutral state, the first clutch mechanism 61 is in an open state, and the second clutch mechanism 63 and the third clutch mechanism 65 are in lock states. In the EV reverse travel state, the EV travel mode is set to cause the motor generator 20 to output drive torque in a direction reverse to the direction in the EV forward travel state. In the EV reverse travel state as well, as illustrated in FIG. 7, the torque outputted from the motor generator 20 is transmitted to the front-wheel output shaft 53 and the rear-wheel output shaft 73 without involvement by the variator 30. This can reduce transmission loss of the torque.

Figure 8:
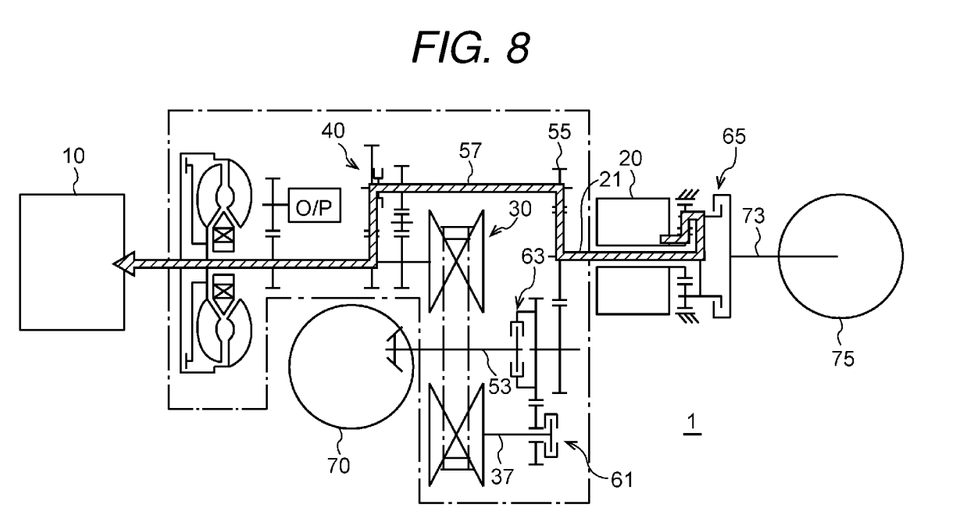
FIG. 8 is a diagram schematically illustrating an operation state in an engine starting state.

On starting the engine 10, the forward-reverse travel switching mechanism 40 is controlled and enabled to output forward-travel torque, and the first clutch mechanism 61, the second clutch mechanism 63, and the third clutch mechanism 65 are in open states. On starting the engine 10, drive torque is outputted from the motor generator 20 to crank the engine 10. As illustrated in FIG. 8, the torque outputted from the motor generator 20 is transmitted to the engine 10 without involvement by the variator 30 so as to crank the engine 10. This can reduce transmission loss of the torque. It is noted that when the engine 10 is started during EV forward travel, the second clutch mechanism 63 and the third clutch mechanism 65 are maintained in lock states.

As has been described heretofore, in the hybrid vehicle system 1 according to the embodiment, the motor generator 20 is not disposed upstream of the variator 30 so that the sum of torque from the engine 10 and the motor generator 20 is not input to the variator 30, thereby making it possible to decrease the torque capacity of the variator 30. Since the torque from the motor generator 20 is not added, the embodiment is applicable to a hybrid vehicle system including the engine 10 with a high displacement.

In the hybrid vehicle system 1 according to the embodiment, in the vehicle-stoppage power generation, the torque outputted from the engine 10 can be transmitted to the motor generator 20 without involvement by the variator 30 so as to improve power generation efficiency.

Since the hybrid vehicle system 1 according to the embodiment includes the first clutch mechanism 61, the variator 30 can be decoupled in the EV travel mode to reduce stirring resistance of the pulleys, thus reducing loss of the torque.

The embodiment of the disclosure has been described in detail above with reference to the accompanying drawings. The disclosure is not limited to such an embodiment. It is apparent that those who have ordinary knowledge in the technical field to which the disclosure pertains would conceive various changes and modifications within the scope of the appended claims, and it is to be understood that such changes and modifications also fall within the technical scope of the disclosure.

The vehicle system according to the embodiment is a hybrid vehicle system. However, the disclosure is not limited to this example. The configuration in which the upstream side and the downstream side of the variator 30 can be directly coupled using the forward-reverse travel switching mechanism 40 may be also applied to a vehicle system including the engine 10 as a drive source. In this case, the low-speed forward travel state and the CVT forward travel state illustrated in FIG. 2 may be used as suited. This configuration as well can decrease the torque capacity of the variator 30 and is applicable to a vehicle system including the engine 10 with a high displacement.

As described above, according to the embodiment of the disclosure, power running drive and regenerative drive can be efficiently performed utilizing the single motor.

The invention claimed is:

1. A hybrid vehicle system comprising:
   an engine capable of outputting torque transmitted to a drive wheel;
   a transmission mechanism configured to convert the torque outputted from the engine at a predetermined transmission gear ratio;
   a first clutch mechanism capable of allowing and disallowing power transmission between the transmission mechanism and the drive wheel;
   a motor generator coupled to a power transmission path between the first clutch mechanism and the drive wheel;
   a second clutch mechanism capable of allowing and disallowing power transmission between the motor generator and the drive wheel; and
   a forward-reverse travel switching mechanism coupled to a power transmission path between the engine and the transmission mechanism,
   the forward-reverse travel switching mechanism being coupled to a countershaft coupled to the power transmission path between the first clutch mechanism and the drive wheel,
   the forward-reverse travel switching mechanism being configured to switch among
     a forward-travel direct coupling state to directly couple an engine side and a drive wheel side to transmit torque in a direction to cause a vehicle to travel forward,
     a reverse-travel direct coupling state to directly couple the engine side and the drive wheel side to transmit torque in a direction to cause the vehicle to travel rearward, and
     a neutral state to decouple the engine side and the drive wheel side from each other,
   wherein
   in low-speed forward travel of the vehicle with large requested torque, the first clutch mechanism is decoupled, the second clutch mechanism is coupled, the forward-reverse travel switching mechanism is in the forward-travel direct coupling state,
   in constant-speed travel of by vehicle with small requested torque, the first clutch mechanism and the second clutch mechanism are coupled and the forward-reverse travel switching mechanism is in the neutral state,
   in reverse travel of the vehicle, the first clutch mechanism is decoupled, the second clutch mechanism is coupled, and the forward-reverse travel switching mechanism is in the reverse-travel direct coupling state,
   in neutral of the vehicle, the first clutch mechanism and the second clutch mechanism are decoupled, and the forward-reverse travel switching mechanism is in the neutral state,
   in electric travel of the vehicle, the first clutch mechanism is decoupled, the second clutch mechanism is coupled, and the forward-reverse travel switching mechanism is in the neutral state, and
   in vehicle-stoppage power generation of causing the motor generator to generate power using the torque from the engine during stoppage of the vehicle, the first clutch mechanism and the second clutch mechanism are decoupled, and the forward-reverse travel switching mechanism is in the forward-travel direct coupling state.

* * * * *